US011610333B2

(12) United States Patent
Song et al.

(10) Patent No.: US 11,610,333 B2
(45) Date of Patent: Mar. 21, 2023

(54) METHODS AND DEVICES FOR ELECTRONICALLY ALTERING CAPTURED IMAGES

(71) Applicant: Motorola Mobility LLC, Chicago, IL (US)

(72) Inventors: Miao Song, Naperville, IL (US); Jagatkumar Shah, Lake in the Hills, IL (US); Yun-Ming Wang, Buffalo Grove, IL (US); Xiayu Hua, Evanston, IL (US)

(73) Assignee: Motorola Mobility LLC, Chicago, IL (US)

( * ) Notice: Subject to any disclaimer, the term of this patent is extended or adjusted under 35 U.S.C. 154(b) by 837 days.

(21) Appl. No.: 16/459,319

(22) Filed: Jul. 1, 2019

(65) Prior Publication Data

US 2021/0004981 A1 Jan. 7, 2021

(51) Int. Cl.

*G06T 7/73* (2017.01)
*G06T 11/00* (2006.01)
*G06F 3/16* (2006.01)
*G06T 3/00* (2006.01)
*G09B 19/00* (2006.01)

(Continued)

(52) U.S. Cl.

CPC .................. *G06T 7/74* (2017.01); *G06F 3/16* (2013.01); *G06T 3/0068* (2013.01); *G06T 11/00* (2013.01); *G09B 19/003* (2013.01); *H04N 5/272* (2013.01); *G06T 3/20* (2013.01); *G06T 3/40* (2013.01); *G06T 3/60* (2013.01); *G06T 2207/30196* (2013.01)

(58) Field of Classification Search

None

See application file for complete search history.

(56) References Cited

U.S. PATENT DOCUMENTS

2014/0003695 A1* 1/2014 Dean .................. A61F 2/30942 382/131
2016/0101321 A1* 4/2016 Aragones ........... G09B 19/0038 434/257
2020/0273229 A1* 8/2020 Thielen .................. G06T 13/40

OTHER PUBLICATIONS

"How It Works—Mirror", Mirror description; Available online https://www.mirror.co/how-it-works ; Unknown publication date but prior to filing of present application; Viewed May 17, 2019.

(Continued)

*Primary Examiner* — Yanna Wu

(74) *Attorney, Agent, or Firm* — Philip H. Burrus, IV

(57) ABSTRACT

An electronic device includes a display and an image capture device electronically capturing one or more images of a subject performing an activity. A wireless communication device can electronically transmit the one or more images to a remote electronic device across a network after a Procrustes superimposition operation is performed to compare the subject to a standard. The wireless communication device can electronically receive one or more electronically altered images identifying differences between one or more standard reference locations situated at one or more predefined features of the standard performing the activity and one or more corresponding subject reference locations situated at one or more predefined features of the subject performing the activity. These electronically altered images can be presented on the display of the electronic device to provide corrective feedback to the subject as how to better perform the activity.

20 Claims, 7 Drawing Sheets

(51) Int. Cl.
*H04N 5/272* (2006.01)
*G06T 3/40* (2006.01)
*G06T 3/60* (2006.01)
*G06T 3/20* (2006.01)

(56) References Cited

OTHER PUBLICATIONS

"Wikipedia—Procrustes analysis", Viewed online at https://en.wikipedia.org/wiki/Procrustes_analysis on Jun. 20, 2019; Unknown Publication Date but prior to filing or present application.
Smith, Mat, "These Smart Glasses Became my Erratic Personal Trainer", Published online on Apr. 7, 2016; available at https://www.engadget.com/2016/04/07/jins-meme-smart-glasses/ ; viewed Jan. 31, 2019.
Yang, Richard , "Pose Trainer: Correcting Exercise Posture using Pose Estimation", Viewed online at https://www.researchgate.net/publication/324759769 on Jan. 31, 2019; Published on Apr. 25, 2018.

* cited by examiner 205
208

405
212
402
403
400
SUPERPOSITION/AR ENGINE
MEMORY
TRAINING/MODEL IMAGES/VIDEO
USER INTERFACE
401
DATA FRAME DECODER/ENCODER SYNC ENGINE/ POSE COMPARER
ONE OR MORE PROCSSORS
WIRELESS COMMUNICATION DEVICE
404
406
PROCRUSTES SUPERIMPOSITION ENGINE
POSITION/ POSE REFERENCE POINT DETECTOR
OTHER SENSORS/ DEVICES
407

501
502
503
208
507
530
540
508
505
103
509
104
506
510
511
516
517
512
513
518
514
519
515
520
521
522
524
523
212
PROCRUSTES SUPERIMPOSITION/ SUPERPIMPOSE CORRECTION
503

METHODS AND DEVICES FOR ELECTRONICALLY ALTERING CAPTURED IMAGES

BACKGROUND

Technical Field

This disclosure relates generally to methods and systems for electronic devices, and more particularly to systems and methods for electronic devices having image capture devices.

Background Art

Fitness, health, and general wellness has become of increasing importance in the twenty-first century. People are increasingly turning to exercise, meditation, and improved nutrition to feel better, become more productive, and hopefully live longer lives of higher quality.

To ensure they exercise properly, people often hire a personal trainer. The assistance of a personal trainer can be beneficial in preventing injury, discovering new exercises, and ensuring that each workout session occurs at maximum efficiency. Unfortunately, many people who would like to hire a trainer either lack the time to travel to the trainer's location or the financial resources to pay the trainer's fees. This can be problematic, as improper exercise may lead to injury. It would be advantageous to have improved systems and methods providing feedback to persons performing activities.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
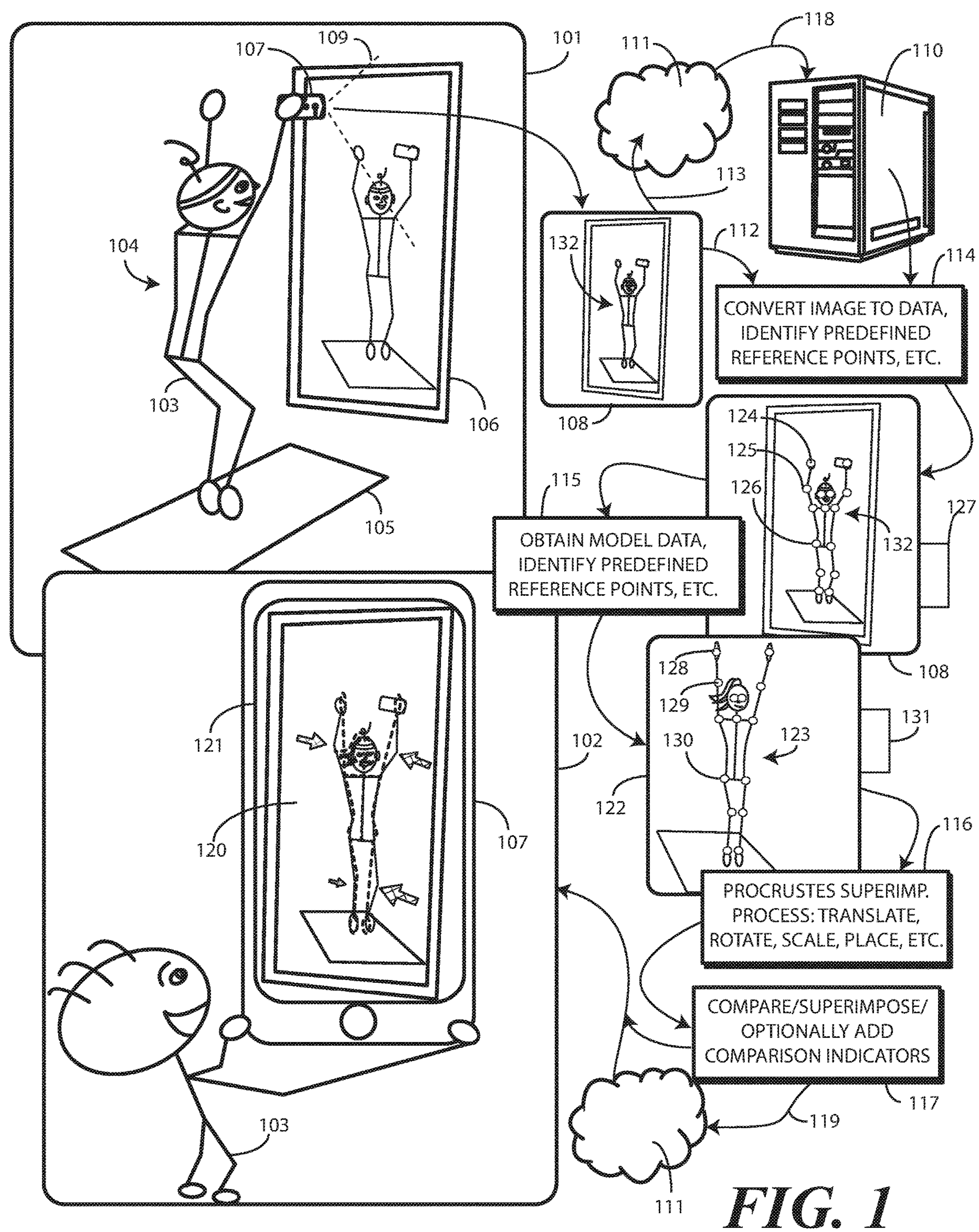
FIG. 1 illustrates one explanatory system and method in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to identifying subject reference locations in one or more electronically captured images, identifying standard reference locations from one or more electronic images retrieved from a memory device, comparing standard reference locations the subject reference locations and, where differences result, electronically altering the electronically captured images to identify the same. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of comparing standard reference locations from electronic images retrieved from memory with subject reference locations in one or more electronically captured images and, where differences exist, electronically altering the one or more electronically captured images to identify those differences as described herein. The non-processor circuits may include, but are not limited to, a radio receiver, a radio transmitter, signal drivers, clock circuits, power source circuits, and user input devices. As such, these functions may be interpreted as steps of a method to perform presentations of the electronically altered images identifying differences between the standard reference locations and the subject reference locations on a display of the electronic device.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within 10 percent, in another embodiment within 5 percent, in another embodiment within 1 percent and in another embodiment within 0.5 percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure contemplate that people enjoy exercising and other activities requiring the person to mechanically align portions of their body in specific ways. Illustrating by example, a person doing yoga may attempt to properly align himself or herself in a chair pose. Alternatively, a person lifting weights may want to ensure that their legs are in the proper alignment for one-legged squats. A person playing a video game may have to align their body in a certain way to achieve a goal or score points in the game, and so forth.

Embodiments of the disclosure also contemplate that such poses can frequently be challenging to achieve alone. The differences between a proper chair pose in yoga, for example, may be very subtle from the position a person is in when attempting the same. Moreover, embodiments of the disclosure contemplate that, in some situations, putting the portions of the body in the improper alignment can give rise to the risk of injury, in addition to making the physical activity in which the person is engaged less efficient. Accordingly, embodiments of the disclosure contemplate that it would be advantageous to have a real-time, intuitive, electronic feedback mechanism allowing a person to correct their physical alignment to agree with a standard during training, yoga, gaming, or in whichever activity the person may be engaged.

Advantageously, embodiments of the disclosure provide systems and methods that are operable with electronic devices having image capture devices and wireless communication capabilities that provide such feedback. In one or more embodiments, a method in an electronic device comprises identifying, with one or more processors of the electronic device, a plurality of subject reference locations situated at predefined features of a subject depicted performing an activity in one or more electronically captured images. Illustrating by example, if a subject is performing the chair pose while practicing yoga, the one or more processors may identify, from one or more electronically captured images, one or more predefined reference locations along the person's body, such as their eyes, ears, nose, neck, shoulders, elbows, hands, hips, knees, and feet. In one or more embodiments, these identified subject reference locations can be mapped to the electronically captured images and stored in the metadata of these images.

In one or more embodiments, the method comprises retrieving, with the one or more processors from a memory of the electronic device, one or more electronic images of a standard depicted performing the activity. In one or more embodiments, the standard comprises a depiction of a trainer or professional performing the same activity. For instance, the standard may be a depiction of a professional yogi performing the chair pose in an electronic image. In other embodiments, the standard can be a computer-generated model executing the activity with perfect form. Other examples of standards depicted in electronic images retrieved from the memory will be obvious to those of ordinary skill in the art having the benefit of this disclosure.

In one or more embodiments, the method comprises identifying, with the one or more processors, a plurality of standard reference locations, corresponding to the plurality of subject reference locations on a one-to-one basis, and situated at predefined features of the standard depicted in the one or more electronic images. Thus, if the identification of the subject reference locations comprises identifying one or more predefined reference locations along the person's body, such as their eyes, ears, nose, neck, shoulders, elbows, hands, hips, knees, and feet, in one or more embodiments those same locations are identified in the depiction of the standard. Accordingly, identification of the standard reference locations may comprise identifying eyes, ears, nose, neck, shoulders, elbows, hands, hips, knees, and feet of the depiction of the professional yogi, computer-generated standard, or other standard in the retrieved electronic images such that the standard reference locations correspond to the subject reference locations on a one-to-one basis in one or more embodiments. In one or more embodiments, these identified standard reference locations can be mapped to the retrieved electronic images and stored in the metadata of these images.

Embodiments of the disclosure contemplate that it will be frequently the case that the electronically captured images of the subject and the retrieved electronic images will be different in scale, location of the standard or subject within the corresponding images, rotational alignment between standard and subject, placement of standard and subject, size of image, distance of image capture device and standard or subject in each image, and so forth. To ensure that the proper comparison between the subject reference locations and the standard reference locations occurs, in one or more embodiments the method comprises performing, with the one or more processors, a Procrustes superimposition operation on one or both of the one or more electronically captured images and/or the retrieved electronic images to superimpose a representation of the standard upon the subject in the one or more electronically captured images.

In one or more embodiments, this Procrustes superimposition operation comprises one or more of electronically translating, rotating, and scaling one or both of the depiction of the subject in the one or more electronically captured images and/or the depiction of the standard in the one or more retrieved electronic images, followed by a superimposition. In one or more embodiments, this results in the electronic adjustment of placement, rotation, and size of one or both of the depiction of the subject in the one or more electronically captured images and/or the depiction of the standard in the one or more retrieved electronic images such that they are similar in placement and size, thereby minimizing the Procrustes distance between the subject reference locations and the standard reference locations across the one or more electronically captured images and the retrieved electronic images. As used herein, the "Procrustes distance" is the square root of the sum of the squared distances between the subject reference locations and the standard reference locations.

In one or more embodiments, the method comprises comparing, with the one or more processors, each standard reference location of the plurality of standard reference locations to each corresponding subject reference location of the plurality of subject reference locations. In one or more embodiments, where there are differences between at least one standard reference location and at least one corresponding subject reference location, the method comprises electronically altering the one or more electronically captured images to identify the differences between the at least one standard reference location and the at least one corresponding subject reference location in one or more electronically altered images.

In one or more embodiments, this electronic alteration can comprise adding one or more arrows to the one or more electronically captured images to create one or more electronically altered images. In one or more embodiments, the electronic alteration comprises causing one or more instructions instructing the subject to move a predefined feature of the subject toward a predefined standard reference location to appear in the one or more electronically captured images.

In still other embodiments, the electronic alteration comprises causing a depiction of the standard to appear in the one or more electronically captured images. Illustrating by example, in one embodiment the depiction of the standard may be superimposed atop the depiction of the subject when the subject is performing the particular activity being compared against the standard's proper form. In another embodiment, the depiction of the standard may be positioned beside the depiction of the subject so that each can be more clearly seen. Other ways in which the electronic alteration identifying the differences between the standard reference locations and the subject reference locations will be described below with reference to FIGS. 6-9. Still others will be obvious to those of ordinary skill in the art having the benefit of this disclosure.

While the aforementioned method can be performed in a single electronic device, embodiments of the disclosure contemplate that it can be advantageous to offload some of the more processor-intensive operations, such as the Procrustes superimposition operation, to a remote electronic device. Illustrating by example, if the electronic device capturing the electronically captured images of the subject performing the activity is a smartphone, despite the fact that modern smartphones have incredible processing power, it may be advantageous to have a server complex or other remote computing device perform some of the operations, e.g., the Procrustes superimposition operation, the comparing operation, and so forth. Advantageously, embodiments of the disclosure provides methods and systems which accommodate this processing offloading that still allow the methods and systems to operate in real time, thereby providing immediate feedback to the subject while the subject is performing the activity.

Illustrating by example, in one or more embodiments an electronic device includes a display, an image capture device capturing one or more images of a subject performing an activity, and a wireless communication device. In one or more embodiments, the wireless communication device electronically transmits the one or more images to a remote electronic device across the network. Examples of such remote electronic devices include computers, server complexes, "cloud" computing devices, networked servers, networked computers, or other electronic devices. Other examples of remote electronic devices will be obvious to those of ordinary skill in the art having the benefit of this disclosure.

In one or more embodiments, the remote electronic device then performs the retrieving operation, the standard reference location identification operations, the Procrustes superimposition operations, the comparing operations, and the electronic altering operations described above. When this occurs, in one or more embodiments the wireless communication device then electronically receives, in response to electronically transmitting the one or more electronically captured images of the subject performing the activity, one or more electronically altered images.

In one or more embodiments, the one or more electronically altered images identify differences between one or more standard reference locations satiated at one or more predefined features of a standard performing the activity, e.g., the eyes, ears, nose, neck, shoulders, elbows, hands, hips, knees, and feet of the depiction of the standard performing the activity, and one or more corresponding subject reference locations situated at one or more predefined features of the subject performing the activity. Thus, in one or more embodiments the one or more electronically altered images identify differences between the one or more standard reference locations and the corresponding one or more standard reference locations on a one-to-one basis.

In one or more embodiments, upon receiving these electronically altered images, one or more processors of the electronic device cause the electronically altered images to be presented on the display of the electronic device. Thus, if the subject's knee is not in alignment with the standard's knee, in one or more embodiments the electronically altered images identify this fact, thereby allowing the subject the opportunity to correct their alignment to match that of the standard as closely as possible.

In one or more other embodiments, a method comprises receiving, with one or more processors, one or more electronically captured images depicting a subject performing an activity. The method then comprises obtaining, with the one or more processors, one or more electronic images of a standard depicted performing the activity.

To compare the depiction of the standard performing the activity and the depiction of the subject performing the same activity, in one or more embodiments the method comprises performing, with the one or more processors, a Procrustes superimposition operation one the one or more electronic images to superimpose a depiction of the standard upon a depiction of the subject in the one or more electronically captured images to create one or more electronically altered images. Thereafter, the method comprises causing, by the one or more processors, the one or more electronically altered images to be visibly presented on a display device.

Turning now to FIG. 1, illustrated therein is one explanatory method and system configured in accordance with one or more embodiments of the disclosure. At step 101, a subject 103 is performing an activity 104. In this illustrative embodiment, the subject 103 is a person and the activity 104 is the practice of yoga. Specifically, in this illustrative embodiment, the subject 103 is attempting to perform the chair pose while standing on a yoga mat 105 that is positioned in front of a mirror 106. The subject 103 is thus able to see themselves in the mirror 106 while performing the activity 104.

In this illustrative embodiment, the subject 103 is holding an electronic device 107. In this illustration, the electronic device 107 is a smartphone comprising a display, an image capture device, a wireless communication device, and one or more processors, in addition to other components. While a smartphone is one example of an electronic device 107 with which systems and method in accordance with embodiments of the disclosure can operate, embodiments are not so limited. In another embodiment, the electronic device 107 is a wearable device, such as a smart watch or smart pendant. In still other embodiments, the electronic device 107 is a tablet computer. In still other embodiments, the electronic device 107 is a smart image capture device, such as a smart camera. Still other types of devices that can serve as the electronic device 107 will be obvious to those of ordinary skill in the art having the benefit of this disclosure.

At step 101, the electronic device 107 includes an image capture device that is electronically capturing 109 one or more electronically captured images 108 of the subject 103 performing the activity 104. Since the subject 103 is attempting to perform the chair pose while standing on a yoga mat 105 that is positioned in front of a mirror 106, the one or more electronically captured images 108 comprise depictions 132 of the subject 103 performing the activity in a mirror 106.

At this point, it should be noted that the various methods in accordance with embodiments of the disclosure can be performed in various ways. In one embodiment, the methods are performed within the electronic device 107 by the one or more processors of the electronic device 107. In other embodiments, the methods are performed within the electronic device 107, but with information retrieved from a remote electronic device 110, e.g., the server complex shown in FIG. 1, across a network 111.

In still other embodiments, it can be advantageous to offload some of the more processor-intensive operations to a remote electronic device 110 across the network 111. Thus, as shown in FIG. 1, once the image capture device electronically captures 109 the one or more electronically captured images 108 of the subject 103 performing the activity 104, the methods and systems of FIG. 1 can proceed along a first path 112 where the operations are performed by the one or more processors of the electronic device 107 in one or more embodiments. Alternatively, the methods and systems of FIG. 1 can proceed along a second path 113 in which a remote electronic device 110 performs one or more of the steps, operations, or procedures, returning the results to the electronic device 107 for presentation on its display.

Illustrating by example, when proceeding along the second path 113, a wireless communication device of the electronic device 107 electronically transmits 118, or delivers, the one or more electronically captured images 108 depicting the subject 103 performing the activity 104 to the remote electronic device 110 across the network 111. The remote electronic device 110 can perform one or more steps of the method, e.g., one or more of steps 114,115,116,117. Thereafter, the wireless communication device of the electronic device 107 can electronically receive 119, in response to the electronically transmitting 118, one or more electronically altered images 120 from the remote electronic device 110 across the network 111.

Of course, a combination of the two processes can be used as well, such as when the various steps 114,115,116,117 of the methods are performed by the one or more processors of the electronic device 107, but with information retrieved from a remote electronic device 110 across a network 111. For instance, the one or more processors of the electronic device 107, operating in conjunction with the wireless communication device, may retrieve one or more electronic images 122 if a standard 123 performing the activity 104 from the remote electronic device 110 across the network 111. The one or more processors may then uses these one or more electronic images 122 if a standard 123 performing the activity 104 in executing subsequent steps.

Similarly, some of steps, e.g., steps 114, 117 can be performed by the one or more processors of the electronic device 107, while other steps, e.g., 115,116, can be performed by the remote electronic device 110, and so forth. Other configurations and divisions of labor between the electronic device 107 and the remote electronic device 110 will be obvious to those of ordinary skill in the art having the benefit of this disclosure. In one or more embodiments, the remote electronic device 110 is a cloud-computing device. The remaining steps of the methods of FIG. 1 will be explained with the understanding that they can be performed in accordance with any of these systems.

At step 114, the electronically captured images 108 of the subject 103 performing the activity 104 are converted to electronic data. In one or more embodiments, step 117 comprises identifying, with one or more processors of the electronic device from the electronic data of the electronically captured images 108 of the subject 103 performing the activity 104, a plurality of subject reference locations 124, 125,126.

In one or more embodiments, the plurality of subject reference locations 124,125,126 are situated at predefined features of the depiction 132 of the subject 103 depicted performing the activity 104 in one or more electronically captured images 108. Since the subject 103 is performing the chair pose while practicing yoga in this illustrative embodiment, the one or more processors of the electronic device 107, or alternatively the one or more processors of the remote electronic device 110, may identify, from one or more electronically captured images 108, one or more predefined reference locations along the subject's body.

In the illustrative embodiment of FIG. 1, the predefined reference locations include the eyes, ears, nose, neck, shoulders, elbows, hands, hips, knees, and feet of the subject 103. While these are illustrative predefined reference locations, embodiments of the disclosure contemplate that the predefined reference locations can vary based upon application. If, for example, the activity 104 was playing the piano instead of practicing yoga, the predefined reference locations may comprise the fingertips, knuckles, joints between fingers, wrist bones, wrist and forearm. If the activity were playing golf, the predefined reference locations may include the club head and club shaft, in addition to locations along the body of the subject 103. In one or more embodiments, these identified subject reference locations 124,125,126 can be mapped to the electronically captured images 108 and stored in the metadata 127 of these images.

If the subject 103 were training his dog, Buster, obedience, the predefined reference locations may include Buster's nose, eyes, shoulders, feet, and tail, in addition to other predefined locations along the subject's body and/or the dog treat the subject were holding, and so forth. If the activity were a marching band marching in alignment along a football field, there may be many subjects, each having their own predefined reference locations associated therewith. Thus, it is to be understood that the predefined reference locations of FIG. 1 are illustrative only, and that numerous others will be obvious to those of ordinary skill in the art having the benefit of this disclosure based upon application.

At step 115, the method comprises retrieving, with one or more processors from a memory of the electronic device 107 or from the remote electronic device 110 across the network 111, or alternatively with the one or more processors of the remote electronic device 110 across the network 111, one or more electronic images 122 of a standard 123 depicted performing the activity 104. In the illustrative embodiment of FIG. 1, the standard 123 comprises a depiction of a professional yogi performing the same activity, which is the chair pose. However, embodiments of the disclosure are not so limited.

In another embodiments, the standard 123 comprises a computer-generated model executing the activity 104 with perfect form. In another embodiment, the standard 123 may be simply a mapping of predefined reference locations corresponding to the subject reference locations 124,125,126 are situated at predefined features of the depiction 132 of the subject 103 depicted performing the activity 104 in one or more electronically captured images 108. In still another embodiment, the standard 123 is a geometric illustration of ideal alignments of the activity 104. These examples of standards are illustrative only, as numerous other examples of standards depicted in electronic images 122 retrieved from the memory of the electronic device 107 and/or from the remote electronic device 110 across the network 111 will be obvious to those of ordinary skill in the art having the benefit of this disclosure.

In one or more embodiments, step 114 further comprises identifying, with the one or more processors, a plurality of standard reference locations 128,129,130 situated at predefined features of the standard 123 depicted in the one or more electronic images 122. In one or more embodiments, the plurality of standard reference locations 128,129,130 correspond to the plurality of subject reference locations 124,125,126 situated at predefined features of the depiction 132 of the subject 103 depicted performing the activity 104 in one or more electronically captured images 108 on a one-to-one basis.

Thus, if the identification of the subject reference locations 124,125,126 occurring at step 114 comprises identifying one or more predefined reference locations along the body of the subject 103, such as their eyes, ears, nose, neck, shoulders, elbows, hands, hips, knees, and feet, in one or more embodiments step 115 comprises identifying those same locations as the plurality of standard reference locations 128,129,130 situated at predefined features of the standard 123 depicted in the one or more electronic images 122. Accordingly, identification of the standard reference locations 128,129,130 may comprise identifying eyes, ears, nose, neck, shoulders, elbows, hands, hips, knees, and feet of the depiction of the professional yogi, computer-generated standard, or other standard 123 in the retrieved electronic images 122 such that the standard reference locations 128,129,130 correspond to the subject reference locations 124,125,126 on a one-to-one basis in one or more embodiments. In one or more embodiments, these identified standard reference locations 128,129,130 locations can be mapped to the retrieved electronic images 122 and stored in the metadata 131 of these electronic images 122.

As noted above, embodiments of the disclosure contemplate that it will be frequently the case that the electronically captured images 108 of the subject 104 and the retrieved electronic images 122 depicting the standard 123 will be different in scale, location of the standard 123 or subject 104 within the corresponding images, rotational alignment between standard 123 and subject 103, placement of standard 123 and subject 103, size of image, distance of image capture device and standard 123 or subject 103 in each image, and so forth. Illustrating by example, in FIG. 1 the subject 103 is capturing reflections in the mirror 106 with a smartphone while performing the chair pose. By contrast, the depictions of the standard 123 in the retrieved electronic images 122 do not include the mirror and are taken directly from the front by a professional photographer. Thus, the size, placement, rotation, and perspective of the subject 103 in the electronically captured images 108 is different from that of the standard 123 in the retrieved electronic images 122.

To ensure that the proper comparison between the subject reference locations 124,125,126 and the standard reference locations 128,129130, in one or more embodiments optional step 116 comprises performing, with the one or more processors of the electronic device 107 and/or the one or more processors of the remote electronic device, a Procrustes superimposition operation on one or both of the depiction 132 of the subject 103 depicted performing the activity 104 in one or more electronically captured images 108 and/or the standard 123 depicted in the one or more retrieved electronic images 122 to superimpose a representation of the standard 123 upon the subject 103 in the one or more electronically captured images 108.

In one or more embodiments, this Procrustes superimposition operation occurring at step 116 comprises one or more of electronically translating, rotating, and scaling one or both of the depiction 132 of the subject 103 depicted performing the activity 104 in one or more electronically captured images 108 and/or the standard 123 depicted in the one or more retrieved electronic images 122, followed by a superimposition of either the standard 123 depicted in the one or more retrieved electronic images 122 or a representation of the standard 123 depicted in the one or more retrieved electronic images 122 upon the one or more electronically captured images 108.

Illustrating by example, to most accurately determine whether the subject 103 is properly performing the chair pose, a comparison between the depiction 132 of the subject 103 depicted performing the activity 104 in one or more electronically captured images 108 and the standard 123 depicted in the one or more retrieved electronic images 122 is performed by superimposition of at least a representation of the standard 123 depicted in the one or more retrieved electronic images 122 in one or more embodiments at step 116. Prior to this superimposition of the representation of the standard 123 depicted in the one or more retrieved electronic images 122, however, in one or more embodiments the standard 123 depicted in the one or more retrieved electronic images 122, or alternatively the depiction 132 of the subject 103 depicted performing the activity 104 in one or more electronically captured images 108, is one or more of translated, rotated, reflected, scaled, and/or replaced in the corresponding image or image data at step 116.

In one or more embodiments, step 116 comprises freely adjusting one or both of the placement in space and/or the size of one or both of the standard 123 depicted in the one or more retrieved electronic images 122 and/or alternatively the depiction 132 of the subject 103 depicted performing the activity 104 in one or more electronically captured images 108. The result of step 116 minimizes the Procrustes distance between the subject reference locations 124,125,126 and the standard reference locations 128,129130 in one or more embodiments.

At step 117, the method compares, with the one or more processors of the electronic device 107 and/or the one or more processors of the remote electronic device 110, each standard reference location 128,129,130 of the plurality of standard reference locations to each corresponding subject reference location 124,125,126 of the plurality of subject reference locations. In one or more embodiments, where there are differences between at least one standard reference location, e.g., standard reference location 129, and at least one corresponding subject reference location, e.g., subject reference location 125, step 117 comprises electronically altering the one or more electronically captured images 108 to identify the differences between the at least one standard reference location and the at least one corresponding subject reference location in one or more electronically altered images 120. Turning briefly to FIGS. 6-9, illustrated therein are various ways this electronic alteration can occur.

Figure 6:
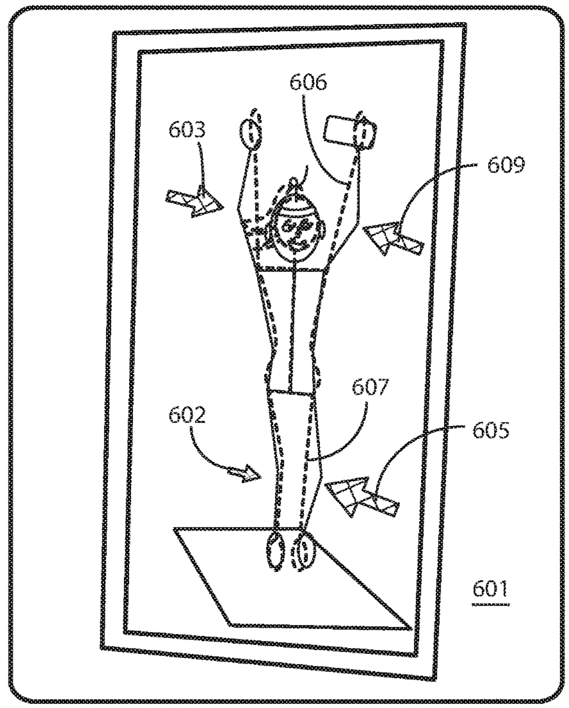
FIG. 6 illustrates one explanatory system and method output presentation display in accordance with one or more embodiments of the disclosure.

Beginning with FIG. 6, illustrated therein is one explanatory electronically altered image 601. In this illustrative embodiment, the electronic alteration of the one or more electronically captured images (108) comprising causing one or more arrows 602,603,604,605 to appear in the one or more electronically altered images 601. In the illustrative embodiment of FIG. 6, the arrows 602,603,604,605 are different sizes, thereby indicating how far from each standard reference location (128,129,130) the corresponding subject reference location (124,125,126) may be, with larger arrows, e.g., arrow 605, indicating more divergence between subject and standard that smaller arrows, e.g., arrow 602. For example, in this illustration the subject's right knee is further from the standard's right knee than the left knee. Accordingly, the right arrow 605 is larger than the left arrow 602. Other configurations for the arrows 602,603,604,605 to provide instructions instructing the subject how to adjust their alignment will be obvious to those of ordinary skill in the art having the benefit of this disclosure.

The electronically altered image 601, the electronic alteration further comprises causing a depiction 606 of the standard to appear in the electronically altered image 601. In this illustrative embodiment, the electronic alteration comprises causing the depiction 606 of the standard to appear superimposed atop a depiction 607 of the subject performing the activity in the electronically altered image 601. In other embodiments, one of which will be shown below with reference to FIG. 10, the depiction 606 of the standard can be caused to appear superimposed alongside the depiction 607 of the subject performing the activity in the electronically altered image. Of course, combinations of these approaches can be used as well. Other techniques and placements for the depiction 606 of the standard appearing with the depiction 607 of the subject performing the activity in the electronically altered image 601 will be obvious to those of ordinary skill in the art having the benefit of this disclosure.

Figure 7:
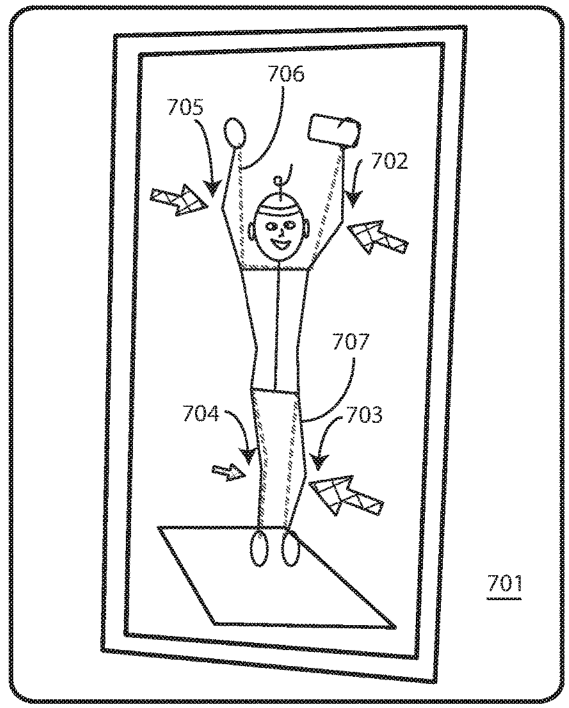
FIG. 7 illustrates another explanatory system and method output presentation display in accordance with one or more embodiments of the disclosure.

Turning now to FIG. 7, illustrated therein is another example of an electronically altered image 701. In this embodiment, the electronic alterations identify the differences 702,703,704,705 between the one or more standard reference locations (128,129,130) and the one or more corresponding subject reference locations (124,125,126) by superimposing a representation 706 of the standard atop a depiction 707 of the subject performing the activity. In this embodiment, rather than being a full depiction of the standard, the representation 706 comprises a more rudimentary depiction of a trainer extracted from the one or more retrieved images, which were previously captured images in one or more embodiments. Moreover, the representation 706 only occurs where the subject reference locations (124,125,126) differ from the one or more standard reference locations (128,129,130) by a predefined threshold, such as one, two, or three centimeters, or one, two, five, or ten more degrees. Other predefined thresholds will be obvious to those of ordinary skill in the art having the benefit of this disclosure.

In the illustrative embodiment of FIG. 7, the subject's elbows and knees are misplaced relative to the same reference features of the standard. Accordingly, the representation 706 comprises lines corresponding to the legs and arms of the standard, which are placed only where the differences beyond the predefined threshold occur. Comparing FIG. 7 with FIG. 6, one can see that the extracted representation 706 may cause less clutter or superfluous noise to be present in the electronically altered image 701. However, embodiments of the disclosure contemplate that many users will prefer a full depiction of the trainer performing the activity to be superimposed atop the depiction of the subject, as shown in the electronically altered image 601 of FIG. 6.

Figure 8:
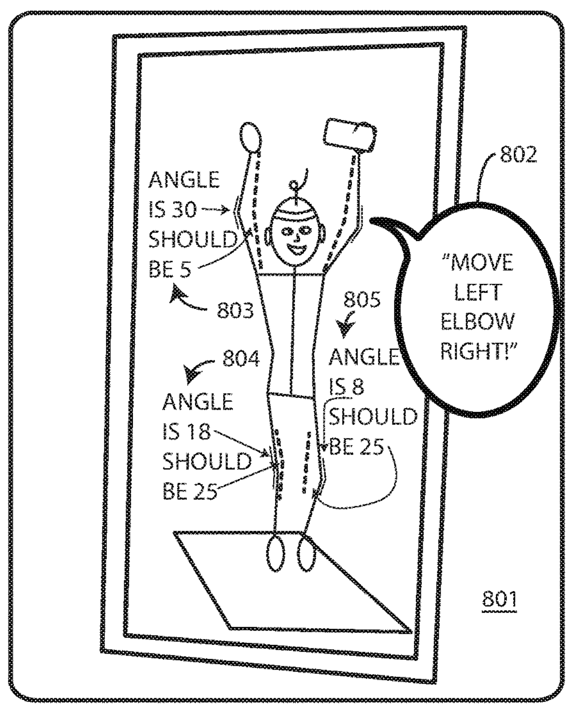
FIG. 8 illustrates still another explanatory system and method output presentation display in accordance with one or more embodiments of the disclosure.

Turning now to FIG. 8, illustrated therein is yet another electronically altered image 801 in accordance with embodiments of the disclosure. In this embodiment, the electronic alteration comprises attaching audio data 802 to the electronically altered image 801. In one or more embodiments, the audio data 802 instructs the subject to move a predefined feature of the subject toward a predefined standard reference location. In this illustration, the audio data 802 audibly outputs the differences between the one or more standard reference locations and the one or more corresponding subject reference locations by stating, "move left elbow right!" Other examples of audio output instructing the subject to move a predefined feature of the subject toward a predefined standard reference location will be obvious to those of ordinary skill in the art having the benefit of this disclosure.

The electronically altered image 801 of FIG. 8 includes another alteration in addition to the attachment of the audio data 802, illustrating that the various electronic alterations of FIGS. 6-9 can be used alone or in combination. Specifically, in this illustrative embodiment electronic alteration also comprises causing one or more geometric alignments 803, 804,805 identifying the differences between the at least one standard reference location and the at least one corresponding subject reference location to appear in the electronically altered image.

In this example, geometric alignment 803 refers to the left elbow, and indicates the subject has an elbow angle of thirty degrees. However, the standard has an elbow angle of only five degrees. Accordingly, the subject is instructed to decrease the elbow angle to move its subject reference location of the elbow toward the standard reference location of the standard. Similarly, geometric alignment 805 refers to the right knee, and indicates the subject has a knee bend of eight degrees, while the standard has a knee bend of twenty-five degrees. Accordingly, the subject is instructed to increase the knee bend to move its subject reference location of the knee toward the standard reference location of the standard. Other techniques for presenting the one or more geometric alignments 803,804,805 identifying the differences between the at least one standard reference location and the at least one corresponding subject reference location will be obvious to those of ordinary skill in the art having the benefit of this disclosure.

Figure 9:
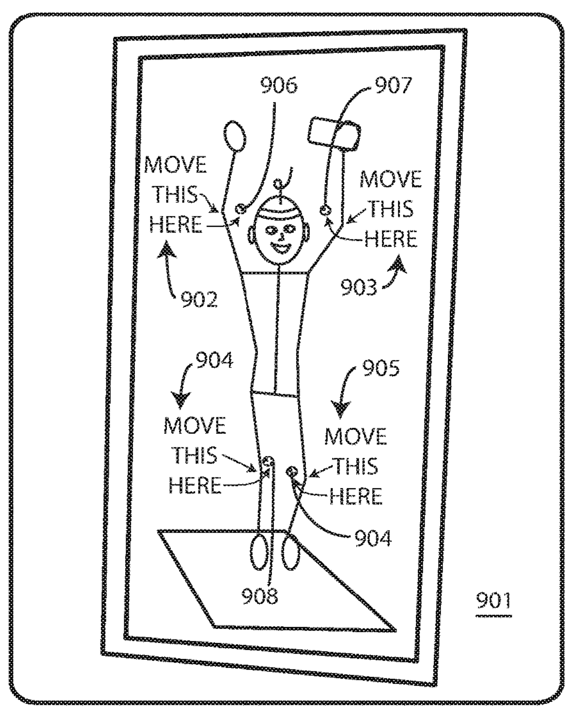
FIG. 9 illustrates yet another explanatory system and method output presentation display in accordance with one or more embodiments of the disclosure.

Turning now to FIG. 9, illustrated therein is still another electronically altered image 901. In this illustrative embodiment, the electronic alteration comprises causing one or more instructions 902,903,904,905 instructing the subject to move a predefined feature of the subject toward a predefined standard reference location 906,907,908,909 to appear in the electronically captured image. For example, instruction 902 says, "move this here," instructing the subject to move their elbow to standard reference location 906. Similarly, instruction 905 instructs the subject to move their right knee to standard reference location 909, and so forth. Other techniques for presenting instructions 902,903,904,905 instructing the subject to move a predefined feature of the subject toward a predefined standard reference location 906,907, 908,909 will be obvious to those of ordinary skill in the art having the benefit of this disclosure.

Turning now back to FIG. 1, where the method proceeded along a first path 112 where the operations are performed by the one or more processors of the electronic device 107, step 102 comprises one or more processors of the electronic device 107 causing presentation of the one or more electronically altered images 120 on the display 121 of the electronic device 107. Where the method proceeded along the second path 113 in which a remote electronic device 110 performs one or more of the steps, operations, or procedures, prior to step 102 the method can comprise receiving 119, with the wireless communication device of the electronic device 107 and in response to the transmitting 118, the one or more electronically altered images 120 identifying the differences between the one or more standard reference locations 128,129,130 situated at one or more predefined features of a standard 123 performing the activity 104 and the one or more corresponding subject reference locations 124,125,126 situated at one or more predefined features of the subject 103 performing the activity 104 from the remote electronic device 110 across the network. Thereafter, step 102 can comprise presenting the one or more electronically altered images 120 on the display 121 of the electronic device 107.

As shown at step 102, the subject 103 can then visually inspect their position compared to the standard 123 to determine where improvement or adjustment is required. While shown looking at the one or more electronically altered images 120 on the display 121 after performing the activity 104 at step 102, embodiments of the disclosure contemplate that the subject 103 could review the one or more electronically altered images 120 on the display 121 in real time as well. Illustrating by example, where a rear-facing camera captures 109 the electronically captured images 108 of step 101 with the display 121 facing the subject 103, the subject 103 could review the one or more electronically altered images 120 on the display 121 while performing the chair pose in real time. Thus, simply by capturing self-images while performing the activity 104, the subject 103 receives instant feedback as if a trainer were present. This is one of the many benefits offered by embodiments of the disclosure. Still others will be obvious to those of ordinary skill in the art having the benefit of this disclosure.

Figure 2:
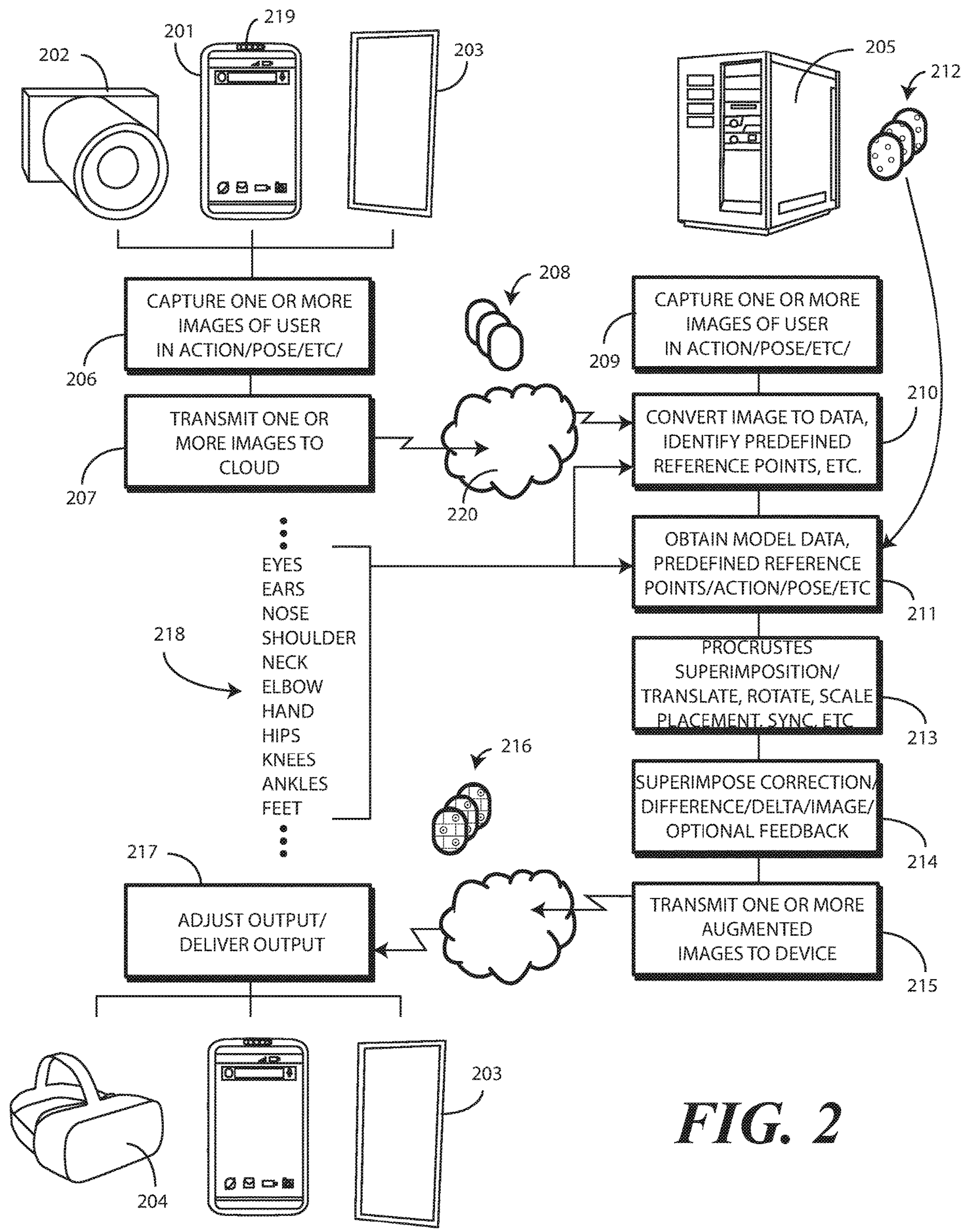
FIG. 2 illustrates explanatory systems and methods in accordance with one or more embodiments of the disclosure.

Turning now to FIG. 2, illustrated therein is one explanatory system and method for identifying differences between a standard and subject performing an activity after a Procrustes superimposition operation has been performed to superimpose a representation of the standard upon the subject in one or more electronically captured images. FIG. 2 reduces the processing requirements of the local electronic device by offloading many of the intensive computing operations to a server complex 205 operating in the cloud.

As noted above, while the method of FIG. 1 can be performed in a single electronic device, embodiments of the disclosure contemplate that it can be advantageous to offload some of the more processor-intensive operations, such as the Procrustes superimposition operation, to a remote electronic device. Illustrating by example, despite the fact that a local electronic device, e.g., smartphone 201, has enough processing power to perform such operations, in the embodiment of FIG. 2 server complex 205 in the cloud (or other remote computing device) perform some of the more processor-intensive operations. Despite the fact that such operations are offloaded, the method of FIG. 2 still allows the system to operate in real time, thereby providing immediate feedback to the subject while the subject is performing the activity.

In the illustrative embodiment of FIG. 2, an electronic device belonging to the subject performs the operations of electronically capturing one or more images of the subject performing the activity. Additionally, the local electronic device presents the electronically altered images on a display of the electronic device. In this illustrative embodiment, other processes are performed "in the cloud" by a server complex 205.

As shown in FIG. 2, and as noted above, the electronic device employed by the subject to electronically capture the one or more images of the subject performing the activity can take a variety of forms. Illustrating by example, in one or more embodiments the electronic device comprises a smartphone 201. In another embodiment, the electronic device comprises a stereoscopic camera 202. As will be described below with reference to FIG. 10, in one or more embodiments the electronically altered images comprise holographic images that can be viewed with a virtual reality headset 204. Accordingly, a stereoscopic camera 202 can capture three dimensional images of the user performing the activity, such as by using two or more lenses that separate image capture into left and right images, thereby simulating human binocular vision.

In still another embodiment, the electronic device employed by the subject comprises a smart mirror 203. To eliminate the need for the subject to hold the smartphone 201, as was the case in the illustrative example of FIG. 1, in one or more embodiments a smart mirror 203 can be equipped with one or more image capture devices, depth imagers, a display that is visible through the reflective surface of the smart mirror 203, wireless communication capabilities, and one or more processors. Advantageously, in one or more embodiments the smart mirror 203 includes an interactive display and embedded camera, and optionally one or more audio output devices, such as one or more loudspeakers. Accordingly, the subject can work out in front of the mirror, while seeing the depiction of the standard and/or the various electronic alterations described above with reference to FIGS. 6-9 while doing the activity. The electronic devices suitable for use by the subject of FIG. 2 are illustrative only. Numerous others will be obvious to those of ordinary skill in the art having the benefit of this disclosure.

Beginning at step 206, an image capture device, e.g., camera 219 of smartphone 201, electronically captures one or more electronically captured images 208 of a subject performing an activity. At step 207, a wireless communication device of the electronic device then electronically transmits the one or more electronically captured images 208 to a remote electronic device across a network 220. In this illustrative embodiment, the remote electronic device is illustrated as a server complex 205. However, other forms of computing devices, e.g., where the remote electronic device is configured as a computer, group of computers, group of servers, group of distributed computers, group of distributed servers, or other configuration, will be obvious to those of ordinary skill in the art having the benefit of this disclosure.

At step 210, the server complex 205 receives, with one or more processors, the one or more electronically captured images 208 depicting the subject performing the activity. In one or more embodiments, step 210 comprises receiving, with a wireless communication circuit of the server complex 205 from a remote electronic device (e.g., smartphone 201) across the network 220, the one or more electronically captured images 208 of the subject performing the activity.

In one or more embodiments, the server complex 205 has access to one or more electronic images 212 of a standard depicted performing the activity. To have such access to the one or more electronic images 212 of the standard depicted performing the activity, at some time prior to the one or more processors of the server complex 205 receiving the one or more electronically captured images 208 of the subject performing the activity, the method includes electronically creating or electronically capturing the one or more electronic images 212 of the standard depicted performing the activity at step 209. These electronically captured or created images can be stored locally at the server complex 205 in one or more embodiments. In other embodiments, the electronically captured or created images can be stored at a remote location and retrieved by the server complex 205 upon receipt of the one or more electronically captured images 208 depicting the subject performing the activity. Other techniques for storing or creating the one or more electronic images 212 depicting the standard performing the activity will be obvious to those of ordinary skill in the art having the benefit of this disclosure.

At step 210, the server complex 205 converts the one or more electronically captured images 208 depicting the subject performing the activity to data so that a plurality of subject reference locations situated at predefined features of the subject performing the activity in the one or more images 208 as previously described. At step 211, the server complex 205 obtains, with the one or more processors of the server complex 205, the one or more electronic images 212 depicting the standard performing the activity. In one or more embodiments, step 211 comprises retrieving, with the one or more processors of the server complex 205, the one or more electronic images 212 depicting the standard performing the activity.

At step 211, in one or more embodiments the one or more processors of the server complex identify a plurality of standard reference locations from the one or more electronic images 212 depicting the standard performing the activity. In one or more embodiments, these standard reference locations correspond to the plurality of subject reference locations identified at step 210 on a one-to-one basis. In one or more embodiments, this means that the plurality of standard reference locations are situated at predefined features of the standard depicted in the one or more electronic images 212, and are the same locations as those situated at predefined features of the subject in the received electronically captured images 208.

Examples of these predefined features 218 are shown in FIG. 2. In one or more embodiments, these predefined features include the eyes, ears, nose, neck, shoulders, elbows, hands, hips, knees, and feet. In one or more embodiments, these predefined features 218 are selected as reference locations of both the subject and the standard at step 210 and 211, respectively. As noted above, while these are illustrative predefined reference locations, embodiments of the disclosure contemplate that the predefined reference locations can vary based upon application. A piano player desiring practice feedback may prefer predefined reference locations such as the fingertips, knuckles, joints between fingers, wrist bones, wrist and forearm. A golfer might prefer predefined reference locations such as the club head, club shaft, grip, hands, elbows, shoulders, head, hips, knees, feet, and ball. Thus, it is to be understood that the predefined features 218 shown in FIG. 2 are illustrative only. Numerous others will be obvious to those of ordinary skill in the art having the benefit of this disclosure based upon application.

At step 213, the server complex 205 performs, with its one or more processors, a Procrustes superimposition operation on the one or more electronic images 212 to superimpose a depiction of the standard upon a depiction of the subject in the one or more electronically captured images 208 to create one or more electronically altered images 216. Alternatively, in another embodiment step 213 can comprise the one or more processors performing the Procrustes superimposition operation on the one or more electronic images 212 to superimpose a representation of the standard upon a depiction of the subject in the one or more electronically captured images 208 to create the one or more electronically altered images 216.

In one or more embodiments, the depiction of the standard appearing in the one or more electronically altered images 216 can comprise a picture, image, ghost halo, or other actual or abstracted image of the standard that is placed atop, off set from, or to the side of, the subject in the one or more electronically altered images 216. Where a representation of the standard is superimposed in the one or more electronically altered images 216, this representation can be one or more lines, one or more shapes, one or more geometric alignments, one or more outlines, or other graphical objects abstracted from illustrating how the subject differs from the standard. Of course, a combination of representations and depictions can be used as well. Other forms of presenting imagery or information taken from the standard in the one or more electronically altered images 216 will be obvious to those of ordinary skill in the art having the benefit of this disclosure.

In one or more embodiments, step 214 comprises causing the one or more electronically altered images 216 to identify differences between the one or more standard reference locations and the one or more subject reference locations. Said differently, in one or more embodiments step 214 comprises the one or more processors of the server complex 205 causing the one or more electronically altered images 216 to identify differences between one or more standard reference locations situated at one or more predefined features 218 of the standard performing the activity and one or more corresponding subject reference locations situated at one or more predefined features 218 of the subject performing the activity. As described above with reference to FIGS. 6-9, the differences can be identified in any of a number of ways, including but not limited to, causing one or more arrows to appear in the one or more electronically altered images 216, causing one or more instructions to appear in the one or more electronically altered images 216, causing the standard to be superimposed upon the subject in the one or more electronically altered images 216, causing one or more audible instructions to be attached to the one or more electronically altered images 216, or combinations thereof. Still other techniques for identifying differences between the standard and the subject in the one or more electronically altered images 216 will be obvious to those of ordinary skill in the art having the benefit of this disclosure.

At step 215, the server complex 205 causes the one or more electronically altered images 216 to be visible on the display of the originally transmitting electronic device. For example, in one or more embodiments step 215 comprises delivering the one or more electronically altered images 216 to the originally transmitting electronic device across the network 222. In one or more embodiments, this occurs when the one or more processors of the server complex 205 cause the wireless communication device of the server complex 205 to transmit the one or more electronically altered images 216 to the originally transmitting electronic device.

At step 217, the originally transmitting electronic device, which includes a display in one or more embodiments, receives the one or more electronically altered images 216. At step 217, electronic adjustments to the one or more electronically altered images 216 can occur, such as formatting the one or more electronically altered images 216 for optimum presentation on the display of the electronic device. Illustrating by example, if the virtual reality headset 204 receives the one or more electronically altered images 216, they may need to be formatted or synchronized so as to provide a three-dimensional experience to the user. Similarly, if the one or more electronically altered images 216 are received by the smart mirror 203, the transparency of the depiction of the standard superimposed on the depiction of the subject in the one or more electronically altered images 216 may need to be adjusted so that the differences between the two can more clearly be seen. Other adjustments performed at step 217 will be obvious to those of ordinary skill in the art having the benefit of this disclosure. Once these adjustments are performed, in one or more embodiments the one or more electronically altered images 216 are presented on the display of the originally transmitting electronic device for viewing by a user.

Figure 3:
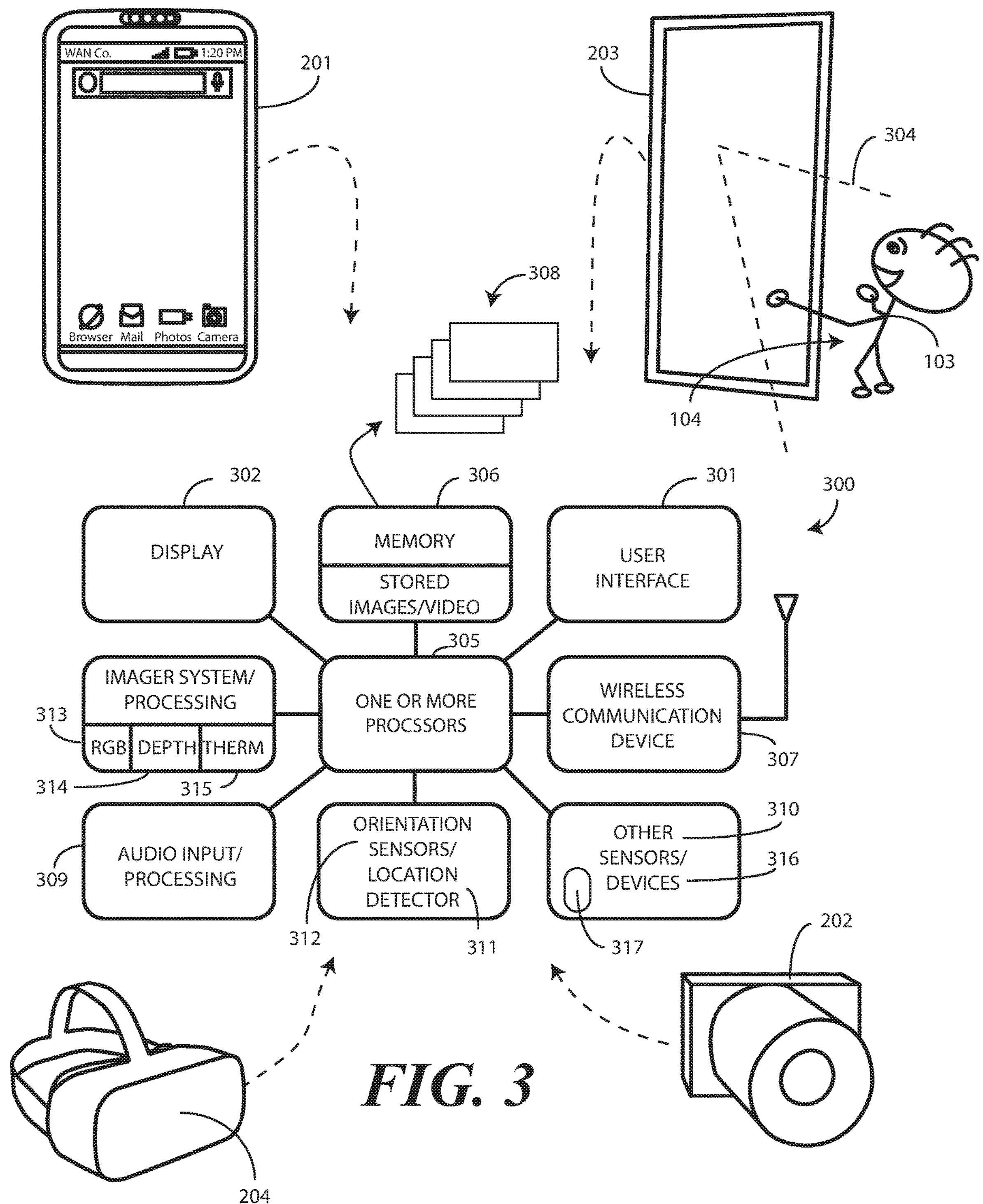
FIG. 3 illustrates one explanatory schematic block diagram of one or more electronic devices configured in accordance with one or more embodiments of the disclosure.

Turning now to FIG. 3, illustrated therein is an illustrative block diagram schematic 300 of one explanatory electronic device employed by a subject in accordance with one or more embodiments of the disclosure. As noted above, the electronic device can be configured in any of a number of ways. Illustrative examples of electronic devices suitable for use by a subject in FIG. 2 include a smartphone 201 or a smart mirror 203. Alternatively, the electronic device can comprise a virtual reality headset 204 with an integrated, or separate, image capture device, one example of which is the a stereoscopic camera 202. Alternatively, the electronic device could be a tablet computer, laptop computer, gaming device, Internet-of-Things device, or other device. Other examples of electronic devices suitable for use by a subject will be obvious to those of ordinary skill in the art having the benefit of this disclosure.

In one or more embodiments, the block diagram schematic 300 is configured as a printed circuit board assembly disposed within a housing of the electronic device. Various components can be electrically coupled together by conductors or a bus disposed along one or more printed circuit boards.

The illustrative block diagram schematic 300 of FIG. 3 includes many different components. Embodiments of the disclosure contemplate that the number and arrangement of such components can change depending on the particular application. Accordingly, electronic devices configured in accordance with embodiments of the disclosure can include some components that are not shown in FIG. 3, and other components that are shown may not be needed and can therefore be omitted.

The illustrative block diagram schematic 300 includes a user interface 301. In one or more embodiments, the user interface 301 includes a display 302, which may optionally be touch-sensitive. In the case of the smart mirror 203 or other similar embodiments, the display comprises a mirrored display 303 presenting the one or more electronically altered images (216) while at least partially reflecting reflections 304 of the subject 103 performing the activity 104. Other types of displays suitable for use with embodiments of the disclosure will be obvious to those of ordinary skill in the art having the benefit of this disclosure.

In one embodiment, users can deliver user input to the display 303 by delivering touch input from a finger, stylus, or other objects disposed proximately with the display 302. In one embodiment, the display 302 is configured as an active matrix organic light emitting diode (AMOLED) display. However, it should be noted that other types of displays, including liquid crystal displays, suitable for use with the user interface 301 would be obvious to those of ordinary skill in the art having the benefit of this disclosure.

In one embodiment, the electronic device includes one or more processors 305. In one embodiment, the one or more processors 305 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the block diagram schematic 300. Each of the application processor and the auxiliary processor(s) can be configured to process and execute executable software code to perform the various functions of the electronic device with which the block diagram schematic 300 operates. A storage device, such as memory 306, can optionally store the executable software code used by the one or more processors 305 during operation.

In this illustrative embodiment, the block diagram schematic 300 also includes a communication device 307 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks. The communication device 307 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication device 307 can include wireless communication circuitry, one of a receiver, a transmitter, or transceiver, and one or more antennas.

In one embodiment, the one or more processors 305 can be responsible for performing the primary functions of the electronic device with which the block diagram schematic 300 is operational. For example, in one embodiment the one or more processors 305 comprise one or more circuits operable with the user interface 301 to present presentation information to a user. The executable software code used by the one or more processors 305 can be configured as one or more modules 308 that are operable with the one or more processors 305. Such modules 308 can store instructions, control algorithms, and so forth.

In one or more embodiments, the block diagram schematic 300 includes an audio input/processor 309. The audio input/processor 309 is operable to receive audio input from an environment about the electronic device 100. The audio input/processor 309 can include hardware, executable code, and speech monitor executable code in one embodiment. The audio input/processor 309 can be operable with one or more predefined authentication references stored in memory 306.

In one embodiment, the audio input/processor 309 is configured to implement a voice control feature that allows a user to speak a specific device command to cause the one or more processors 305 to execute a control operation. For example, the user may say, "Authenticate Me Now." This statement comprises a device command requesting the one or more processors to authenticate a user. Consequently, this device command can cause the one or more processors 305 to begin the authentication process. In short, in one embodiment the audio input/processor 309 listens for voice commands, processes the commands and, in conjunction with the one or more processors 305, performs a predefined operation in response to voice input.

Various sensors 310 can be operable with the one or more processors 305. These sensors 310 can include a touch sensor. The touch sensor can include a capacitive touch sensor, an infrared touch sensor, resistive touch sensors, or another touch-sensitive technology.

Another example of a sensor 310 is a geo-locator that serves as a location detector 311. Location can be determined by capturing the location data from a constellation of one or more earth orbiting satellites, or from a network of terrestrial base stations to determine an approximate location. Examples of satellite positioning systems suitable for use with embodiments of the present invention include, among others, the Navigation System with Time and Range (NAVSTAR) Global Positioning Systems (GPS) in the United States of America, the Global Orbiting Navigation System (GLONASS) in Russia, and other similar satellite positioning systems. The satellite positioning systems based location fixes of the location detector 311 autonomously or with assistance from terrestrial base stations, for example those associated with a cellular communication network or other ground based network, or as part of a Differential Global Positioning System (DGPS), as is well known by those having ordinary skill in the art. The location detector 311 may also be able to determine location by locating or triangulating terrestrial base stations of a traditional cellular network, such as a CDMA network or GSM network, or from other local area networks, such as Wi-Fi networks.

Another example of a sensor 310 is one or more motion detectors configured as an orientation detector 312 that determines an orientation and/or movement of the electronic device in three-dimensional space. Illustrating by example, the orientation detector 312 can include an accelerometer, gyroscopes, or other device to detect device orientation and/or motion of the electronic device. Using an accelerometer as an example, an accelerometer can be included to detect motion of the electronic device. Additionally, the accelerometer can be used to sense some of the gestures of the user, such as one talking with their hands, running, or walking.

The orientation detector 312 can determine the spatial orientation of an electronic device in three-dimensional space by, for example, detecting a gravitational direction. In addition to, or instead of, an accelerometer, an electronic compass can be included to detect the spatial orientation of the electronic device relative to the earth's magnetic field. Similarly, one or more gyroscopes can be included to detect rotational orientation of the electronic device.

To capture data depicting the subject 103 performing the activity 104, a variety of devices, alone or in combination, can be included in the block diagram schematic 300. Examples of these devices include an imager 313, a depth imager 314, and, optionally, a thermal sensor 315. Others will be obvious to those of ordinary skill in the art having the benefit of this disclosure.

In one embodiment, the imager 313 comprises a two-dimensional imager configured to receive at least one image of the subject 103 when performing the activity 104. In one embodiment, the imager 313 comprises a two-dimensional Red-Green-Blue (RGB) imager. In another embodiment, the imager 313 comprises an infrared imager. Other types of imagers suitable for use as the imager 313 to capture images of the subject 103 performing the activity 104 will be obvious to those of ordinary skill in the art having the benefit of this disclosure.

Where includes, the thermal sensor 315 can also take various forms. In one embodiment, the thermal sensor 315 is simply a proximity sensor component comprising an infrared receiver without a corresponding transmitter. In another embodiment, the thermal sensor 315 comprises a simple thermopile. In another embodiment, the thermal sensor 315 comprises an infrared imager that captures the amount of thermal energy emitted by an object. Other types of thermal sensors 315 will be obvious to those of ordinary skill in the art having the benefit of this disclosure.

Where included, the depth imager 314 can take a variety of forms. In a first embodiment, the depth imager 314 comprises a pair of imagers separated by a predetermined distance, such as three to four images. This "stereo" imager works in the same way the human eyes do in that it captures images from two different angles and reconciles the two to determine distance.

In another embodiment, the depth imager 314 employs a structured light laser. The structured light laser projects tiny light patterns that expand with distance. These patterns land on a surface, such as the body of the subject 103 when performing the activity 104, and are then captured by an imager. By determining the location and spacing between the elements of the pattern, three-dimensional mapping can be obtained.

In still another embodiment, the depth imager 314 comprises a time of flight device. Time of flight three-dimensional sensors emit laser or infrared pulses from a photodiode array. These pulses reflect back from a surface, such as the body of the subject 103 when performing the activity 104. The time it takes for pulses to move from the photodiode array to the surface and back determines distance, from which a three-dimensional mapping of a surface can be obtained. Regardless of embodiment, the inclusion of a depth imager 314 can provide a third "z-dimension" to the x-dimension and y-dimension defining the two-dimensional image captured by the imager 313, thereby allowing for three-dimensional, and even holographic, feedback to be provided to the subject.

Other components 316 operable with the one or more processors 305 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 316 can also optionally include a light sensor that detects changes in optical intensity, color, light, or shadow in the environment of an electronic device. This can be used to make inferences about context such as weather or colors, walls, fields, and so forth, or other cues. An infrared sensor can be used in conjunction with, or in place of, the light sensor. The infrared sensor can be configured to detect thermal emissions from an environment about the electronic device.

The other components 316 can also include an audio output device 317, one example of which is a loudspeaker. In one or more embodiments, as described above with reference to FIG. 8, the one or more processors cause the audio output device 317 to audibly output the differences between the one or more standard reference locations and the one or more corresponding subject reference locations to provide feedback to the subject 103 when, or after, performing the activity 104.

Figure 4:
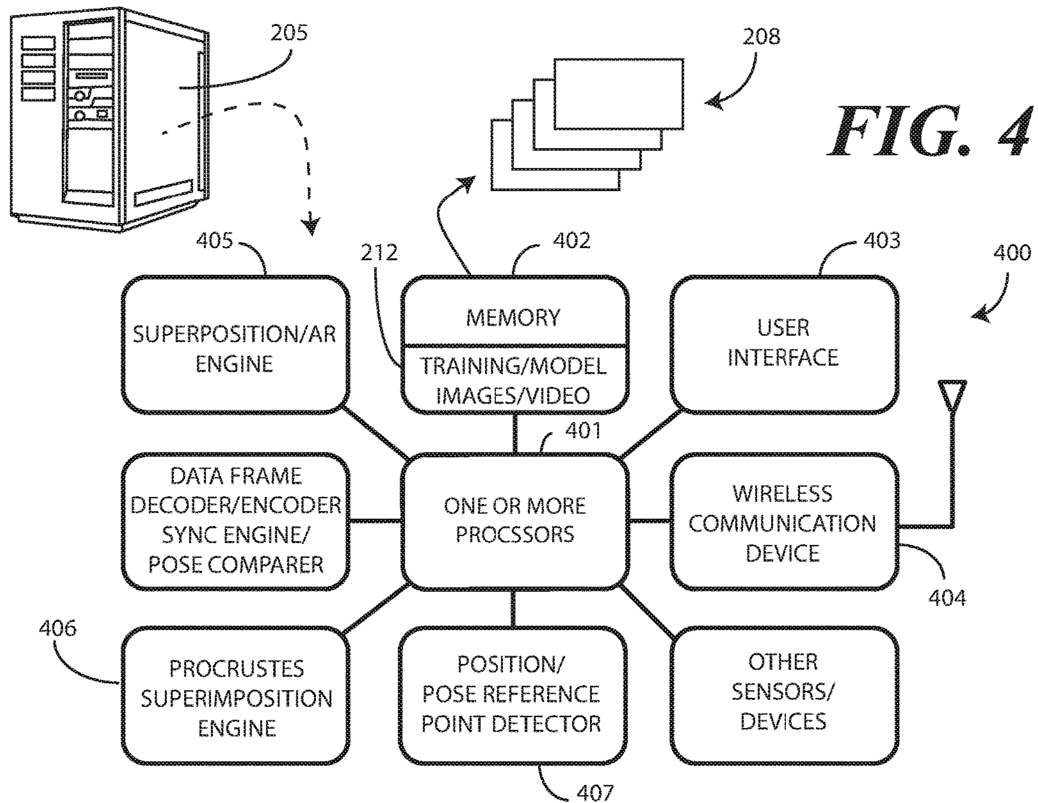
FIG. 4 illustrates one explanatory server complex in accordance with one or more embodiments of the disclosure.

Turning now to FIG. 4, illustrated therein is one explanatory server complex 205 configured in accordance with one or more embodiments of the disclosure. An illustrative schematic block diagram 400 is also shown in FIG. 4. As with the block diagram schematic (300) of FIG. 3, it is to be understood that the schematic block diagram 400 of FIG. 4 is provided for illustrative purposes only and for illustrating components of one explanatory server complex 205 configured in accordance with one or more embodiments of the disclosure. Accordingly, the components shown in either FIG. 3 or FIG. 4 are not intended to be complete schematic diagrams of the various components required for a particular device, as other devices configured in accordance with embodiments of the disclosure may include various other components not shown in FIG. 3 or FIG. 4. Alternatively, other terminal devices configured in accordance with embodiments of the disclosure or may include a combination of two or more components or a division of a particular component into two or more separate components, and still be within the scope of the present disclosure.

As described above with reference to FIG. 2, in one or more embodiments the server complex 205 can be configured with performing processor-intensive methods, operations, steps, functions, or procedures associated with creating electronically altered images. In one or more embodiments, the electronically altered images identify differences between one or more standard reference locations situated at one or more predefined features of the standard performing the activity and one or more corresponding subject reference locations situated at one or more predefined features of the subject performing the activity.

In one or more embodiments, the server complex 205 includes one or more processors 401, one or more memory devices 402, and one or more user interface devices 403, e.g., a display, a keyboard, a mouse, audio input devices, audio output devices, and alternate visual output devices. The server complex 205 also includes a communication device 404. These components can be operatively coupled together such that, for example, the one or more processors 401 are operable with the one or more memory devices 402, the one or more user interface devices 403, and/or the communication device 404 in one or more embodiments.

The one or more processors 401 can include a microprocessor, a group of processing components, one or more ASICs, programmable logic, or other type of processing device. The one or more processors 401 can be configured to process and execute executable software code to perform the various functions of the server complex 205.

The one or more memory devices 402 can optionally store the executable software code used by the one or more processors 401 in carrying out the operations of the visualization system. The one or more memory devices 402 may include either or both of static and dynamic memory components. The one or more memory devices 402 can store both embedded software code and user data. The software code can embody program instructions and methods to operate the various functions of the terminal device, and also to execute software or firmware applications and modules such as the superposition/augmented reality engine 405, the Procrustes superimposition engine 406, and the position/pose reference point detection engine 407.

The communication device 404 can receive one or more electronically captured images 208 depicting a subject performing an activity. The position/pose reference point detection engine 407 can then identify a plurality of subject reference locations situated at predefined features of a subject depicted performing the activity in the one or more electronically captured images 208.

The position/pose reference point detection engine 407 can perform other operations as well. In one or more embodiments, the one or more processors 401 retrieve, from the one or more memory devices 402 of the server complex 205, one or more electronic images 212 of a standard depicted performing the activity. In one or more embodiments, the position/pose reference point detection engine 407 then identifies a plurality of standard reference locations situated at predefined features of the standard depicted in the one or more electronic images 212.

In one or more embodiments, the plurality of standard reference locations situated at the predefined features of the standard depicted in the one or more electronic images 212 correspond to the plurality of subject reference locations situated at the predefined features of the subject depicted performing the activity in the one or more electronically captured images 208 on a one-to-one basis. Thus, a predefined subject reference location of the left hand of the subject would correspond to the predefined standard reference location of the left hand, while the right eye as a predefined standard reference location would correspond to the right eye of the subject, and so forth.

Figure 5:
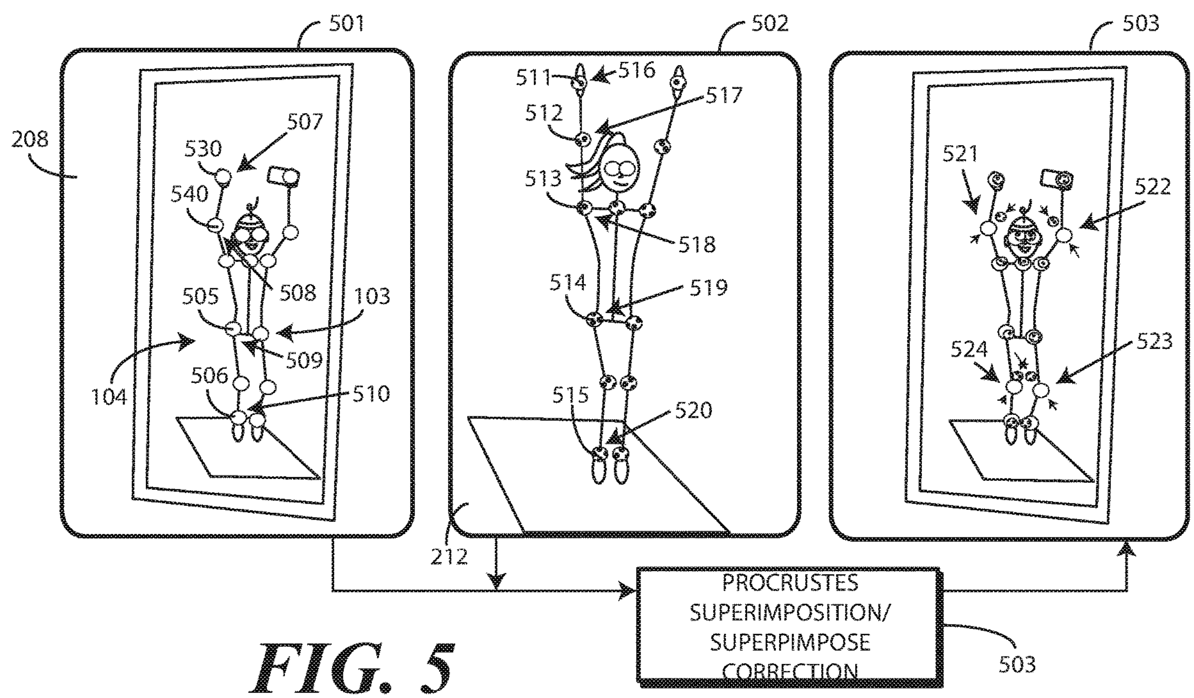
FIG. 5 illustrates one explanatory method in accordance with one or more embodiments of the disclosure.

The Procrustes superimposition engine 406 can then perform a Procrustes superimposition operation one the one or more electronic images 212 to superimpose a depiction of the standard upon a depiction of the subject in the one or more electronically captured images 208 to create one or more electronically altered images. Thereafter, the superposition/augmented reality engine 405 can identify differences between one or more standard reference locations situated at one or more predefined features of the standard performing the activity and one or more corresponding subject reference locations situated at one or more predefined features of the subject performing the activity in the one or more electronically altered images. Turning briefly to FIG. 5, illustrated therein is one method by which this can occur.

As shown at step 501, the position/pose reference point detection engine (407) has identified a plurality of subject reference locations 530,540,505,506 situated at predefined features 507,508,509,510 of a subject 103 depicted performing the activity 104 in the one or more electronically captured images 208. At step 502, the position/pose reference point detection engine (407) has identified a plurality of standard reference locations 511,512,513,514,515 situated at predefined features 516,517,518,519,520 of the standard 123 depicted in the one or more electronic images 212.

As seen by comparing step 501 and step 502, the one or more electronically captured images 208 and the one or more electronic images 212 are captured with different scales, with the imagers at different distances from the corresponding subject, and at different angles. Moreover, the subject 103 and standard 123 are of different physical statures and builds.

To provide an accurate comparison of how well the subject 103 is performing the activity 104 compared to the standard, at step 503 the Procrustes superimposition engine (406) performs a Procrustes superimposition operation one the one or more electronic images 212 to superimpose a depiction of the standard upon a depiction of the subject in the one or more electronically captured images 208 to create one or more electronically altered images 216 at step 504. As noted above, this Procrustes superimposition operation can comprise one or more of electronically translating, rotating, and scaling one or both of the depiction of the subject 103 in the one or more electronically captured images 208 and/or the depiction of the standard 123 in the one or more retrieved electronic images 212, followed by a superimposition.

In one or more embodiments, this results in the electronic adjustment of placement, rotation, and size of one or both of the depiction of the subject 103 in the one or more electronically captured images 208 and/or the depiction of the standard 123 in the one or more retrieved electronic images 212 such that they are similar in placement and size. In one or more embodiments, this minimizes the Procrustes distance between the subject reference locations 530,540,505,506 and the standard reference locations 511,512,513,514,515 across the one or more electronically captured images 208 and the retrieved electronic images 212.

At step 504, the superposition/augmented reality engine (405) has identified differences 521,522,523,524 between one or more standard reference locations 511,512,513,514,515 situated at one or more predefined features 516,517,518,519,520 of the standard 123 performing the activity 104 and one or more corresponding subject reference locations 530,540,505,506 situated at one or more predefined features 507,508,509,510 of the subject 103 performing the activity 104 in the one or more electronically altered images 216. In this illustrative embodiment, the superposition/augmented reality engine (405) has identified these differences 521,522,523,524 by superimposing both arrows and the mismatched standard/subject reference locations so that the subject 103, when viewing the one or more electronically altered images 216, can move their features such that their subject reference locations overlap, approximate, or otherwise come close to, the standard reference locations. Other techniques for identifying these differences 521,522,523,524 have been described above. Still others will be obvious to those of ordinary skill in the art having the benefit of this disclosure.

Turning now back to FIG. 4, in one or more embodiments the one or more processors 401 can cause the communication device 404 to transmit the electronically altered images (216) to a remote electronic device across a network. In one or more embodiments, the communication device 404 comprises any of a number of wired or wireless technologies for communication. Examples of these technologies include wired plain old telephone service (POTS) technologies, wired Ethernet technologies such as those configured in accordance with the IEEE 802 networking standards, peer-to-peer or ad hoc communications, frequency modulated communication, amplitude modulated communication, or IEEE 802.11 wireless communication. Other forms of communication technologies suitable for inclusion with the communication device 404 will be obvious to those having the benefit of this disclosure. The communication device 404 can include wired or wireless communication circuitry, one of a receiver, a transmitter, or transceiver. Where wireless, the communication device 404 can include one or more antennas.

Figure 10:
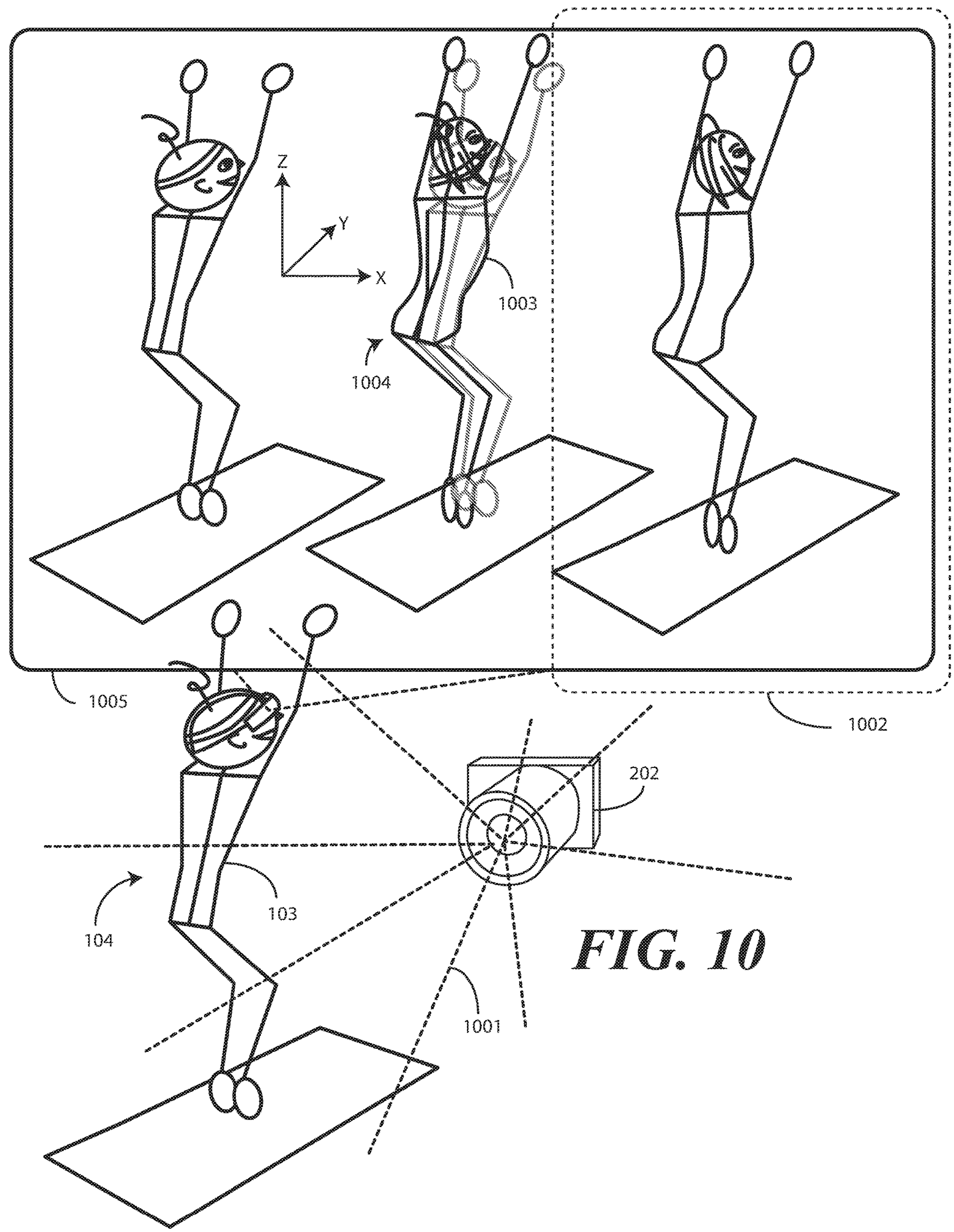
FIG. 10 illustrates another explanatory system in accordance with one or more embodiments of the disclosure.

The receiving device can then present the electronically altered images (216) on a display. Turning now to FIG. 10, illustrated therein is another method by which this can be done.

To this point, the electronically altered images (216) have been described as being two-dimensional images. However, embodiments of the disclosure are not so limited. In other embodiments, the electronically altered images (216) can be configured as three-dimensional images or holographic images. FIG. 10 illustrates one such embodiment.

As shown in FIG. 10, a stereoscopic camera 202 captures one or more three-dimensional images 1001 of a subject 103 performing an activity 104. The stereoscopic camera 202 can capture these three-dimensional images in a variety of ways. Illustrating by example, in one or more embodiments the stereoscopic camera 202 employs two or more lenses that separate image capture into left and right images, thereby simulating human binocular vision to capture the one or more three-dimensional images 1001 of a subject 103 performing an activity 104. In another embodiment, the stereoscopic camera 202 simply employs a depth imager (314) to capture the one or more three-dimensional images 1001 of a subject 103 performing an activity 104, as previously described. Other techniques for capturing one or more three-dimensional images 1001 of a subject 103 performing an activity 104 will be obvious to those of ordinary skill in the art having the benefit of this disclosure.

Thereafter, one or more processors of either a local or remote electronic device identify a plurality of subject reference locations situated at predefined features of a subject depicted performing an activity in the one or more three-dimensional images 1001 of a subject 103 performing an activity 104. The one or more processors of the local or remote electronic device can then retrieve one or more electronic images of a standard depicted performing the activity. In one or more embodiments, these electronic images comprise one or more three-dimensional electronic images 1002 of a standard performing the activity 104.

As previously described, the one or more processors of the local or remote electronic device can then identify a plurality of standard reference locations, corresponding to the plurality of subject reference locations on a one-to-one basis, and situated at predefined features of the standard depicted in the one or more three-dimensional electronic images 1002. The one or more processors of the local or remote electronic device can perform a Procrustes superimposition operation one the one or more three-dimensional electronic images 1002 to superimpose a representation 1003 of the standard upon the subject 1004 in the one or more three-dimensional images 1001 of a subject 103 performing an activity 104.

The one or more processors of the local or remote electronic device can then compare each standard reference location of the plurality of standard reference locations to each corresponding subject reference location of the plurality of subject reference locations. Where there are differences between at least one standard reference location and at least one corresponding subject reference location, the one or more processors of the local or remote electronic device can electronically alter the one or more three-dimensional images 1001 of a subject 103 performing an activity 104 to identify the differences between the at least one standard reference location and the at least one corresponding subject reference location in one or more electronically altered three-dimensional images 1005.

In the illustrative embodiment of FIG. 10, the one or more electronically altered three-dimensional images 1005 comprise holographic images. In the illustrative holographic images of FIG. 10, the representation of the standard is depicted both superimposed atop, and along side the representation of the subject 103. This allows the subject 103 to look at the representation of the standard independently, or atop his representation to properly correct his form. Other electronically altered three-dimensional images 1005 identifying the differences between the at least one standard reference location and the at least one corresponding subject reference location in the one or more electronically altered three-dimensional images 1005 will be obvious to those of ordinary skill in the art having the benefit of this disclosure.

Figure 11:
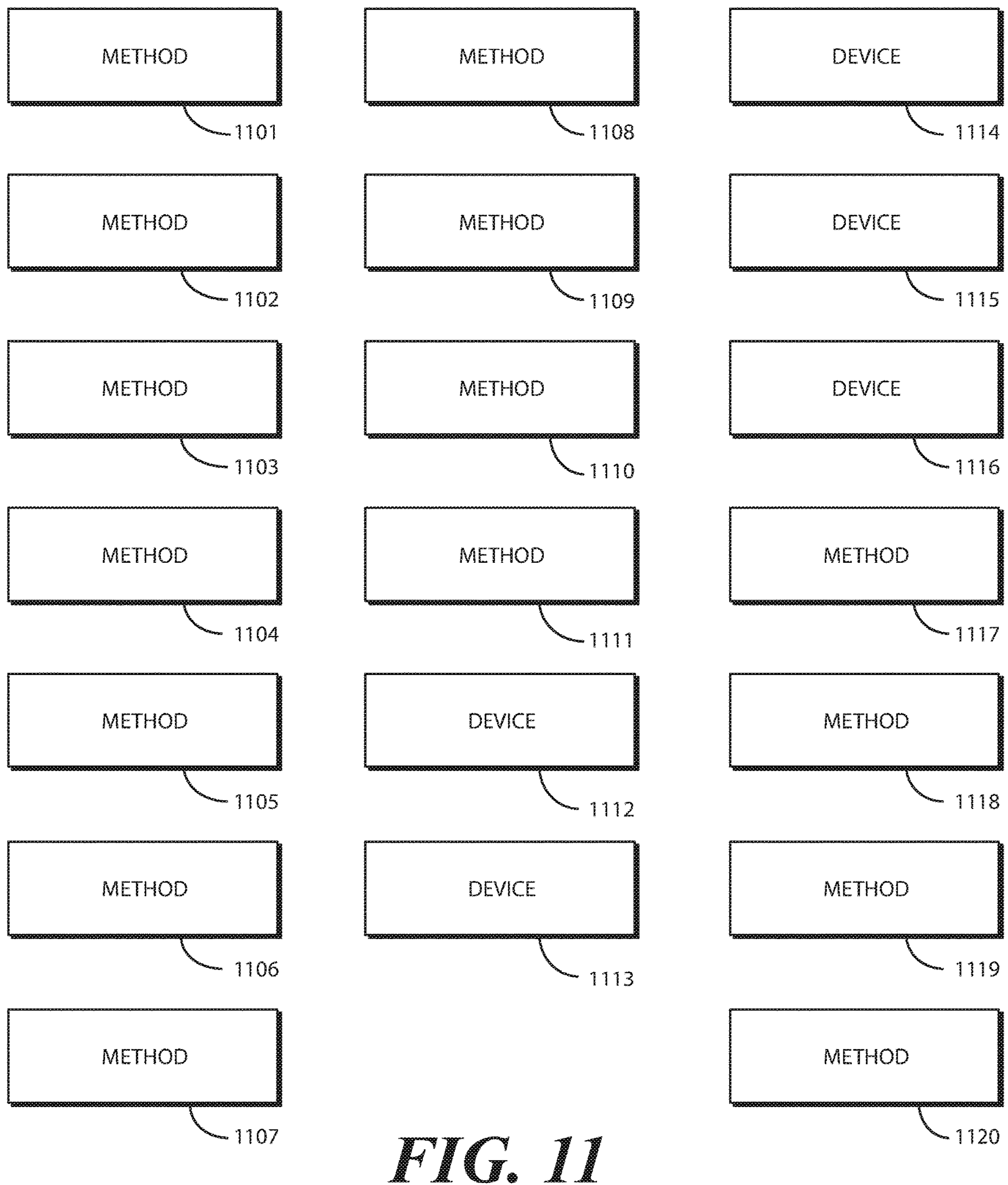
FIG. 11 illustrates various embodiments of the disclosure.

Turning now to FIG. 11, illustrated therein are various embodiments of the disclosure. At 1101, a method in an electronic device comprises identifying, with one or more processors of the electronic device, a plurality of subject reference locations situated at predefined features of a subject depicted performing an activity in one or more electronically captured images. At 1101, the method comprises retrieving, with the one or more processors from a memory of the electronic device, one or more electronic images of a standard depicted performing the activity At 1101, the method comprises identifying, with the one or more processors, a plurality of standard reference locations, corresponding to the plurality of subject reference locations on a one-to-one basis, and situated at predefined features of the standard depicted in the one or more electronic images. At 1101, the method comprises performing, with the one or more processors, a Procrustes superimposition operation one the one or more electronic images to superimpose a representation of the standard upon the subject in the one or more electronically captured images.

At 1101, the method comprises comparing, with the one or more processors, each standard reference location of the plurality of standard reference locations to each corresponding subject reference location of the plurality of subject reference locations. Where there are differences between at least one standard reference location and at least one corresponding subject reference location, the method at 1101 comprises electronically altering the one or more electronically captured images to identify the differences between the at least one standard reference location and the at least one corresponding subject reference location in one or more electronically altered images.

At 1102, the method of 1101 further comprises receiving, with a wireless communication circuit from a remote electronic device across a network, the one or more electronically captured images of the subject performing the activity. At 1103, the method of 1102 further comprises delivering, with the wireless communication circuit, the electronically altered images to the remote electronic device across the network.

At 1104, the electronic altering of 1101 comprises causing one or more arrows to appear in the one or more electronically altered images. At 1105, the electronic altering of 1101 comprises causing one or more instructions instructing the subject to move a predefined feature of the subject toward a predefined standard reference location to appear in the one or more electronically captured images.

At 1105, the electronic altering of 1101 comprises causing a depiction of the standard to appear in the one or more electronically altered images. At 1107, the electronic altering of 1106 comprises causing the depiction of the standard to appear superimposed atop a depiction of the subject performing the activity in the one or more electronically altered images.

At 1108, the electronic altering of 1101 comprises attaching audio data to the one or more electronically altered images, the audio data instructing the subject to move a predefined feature of the subject toward a predefined standard reference location. At 1109, the electronic altering of 1101 comprises causing one or more geometric alignments identifying the differences between the at least one standard reference location and the at least one corresponding subject reference location in the one or more electronically altered images. At 1101, the one or more electronically altered images comprise holographic images.

At 1111, an electronic device comprises a display. At 1111, the electronic device comprises an image capture device electronically capturing one or more images of a subject performing an activity. At 1111, the electronic device comprises a wireless communication device electronically transmitting the one or more images to a remote electronic device across a network.

At 1111, the wireless communication device electronically receives, in response to the electronically transmitting, one or more electronically altered images identifying differences between: one or more standard reference locations situated at one or more predefined features of a standard performing the activity and one or more corresponding subject reference locations situated at one or more predefined features of the subject performing the activity. At 1111, the one or more processors cause presentation of the one or more electronically altered images on the display of the electronic device.

At 1112, the one or more images of 1111 comprise depictions of the subject performing the activity in a mirror. At 1113, the display of 1111 comprises a mirrored display presenting the one or more electronically altered images while at least partially reflecting reflections of the subject performing the activity.

At 1114, the one or more electronically altered images of 1111 identify the differences between the one or more standard reference locations and the one or more corresponding subject reference locations by superimposing a representation of the standard atop a depiction of the subject performing an activity. At 1115, the representation of the standard at 1114 comprises a depiction of a trainer extracted from one or more previously captured images.

At 1116, the electronic device of 1111 further comprises an audio output device. At 1116, the one or more processors cause the audio output device to audibly output the differences between the one or more standard reference locations and the one or more corresponding subject reference locations.

At 1117, a method in an electronic device comprises receiving, with one or more processors, one or more electronically captured images depicting a subject performing an activity. At 1117, the method comprises obtaining, with the one or more processors, one or more electronic images of a standard depicted performing the activity.

At 1117, the method comprises performing, with the one or more processors, a Procrustes superimposition operation one the one or more electronic images to superimpose a depiction of the standard upon a depiction of the subject in the one or more electronically captured images to create one or more electronically altered images. At 1117, the method comprises causing, by the one or more processors, the one or more electronically altered images to be visibly presented on a display device.

At 1118, the method of 1117 comprises causing, by the one or more processors, the one or more electronically altered images to identify differences between one or more standard reference locations situated at one or more predefined features of the standard performing the activity and one or more corresponding subject reference locations situated at one or more predefined features of the subject performing the activity. At 1119, the method of 1118 comprises transmitting, with a wireless communication circuit, the one or more electronically altered images across a network to a remote electronic device comprising the display device. At 1120, the performing of the Procrustes superimposition operation at 1119 comprises one or more of translating, rotating, scaling, rotating, or reflecting, the depiction of the standard to cause the depiction of the standard and the depiction of the subject in the one or more electronically altered images to have substantially the same shape.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:

identifying, with one or more processors of the electronic device, a plurality of subject reference points situated at predefined features of a subject depicted performing an activity in one or more electronically captured images;

retrieving, with the one or more processors from a memory of the electronic device, one or more electronic images of a standard depicted performing the activity;

identifying, with the one or more processors, a plurality of standard reference points, corresponding to the plurality of subject reference points on a one-to-one basis, and situated at predefined features of the standard depicted in the one or more electronic images;

performing, with the one or more processors, a Procrustes superimposition operation one the one or more electronic images to superimpose a representation of the standard upon the subject in the one or more electronically captured images;

comparing, with the one or more processors, each standard reference point of the plurality of standard reference points to each corresponding subject reference point of the plurality of subject reference points; and where there are differences between at least one standard reference point and at least one corresponding subject reference point, electronically altering the one or more electronically captured images to identify the differences between the at least one standard reference point and the at least one corresponding subject reference point in one or more electronically altered images;

the electronically altering the one or more electronically captured images comprising causing one or more arrows of different sizes to appear in the one or more electronically altered images, wherein the different sizes indicate how far each standard reference point is situated from a corresponding subject reference point, with larger arrows indicating greater divergence between the each standard reference point and the corresponding subject reference point.

2. The method of claim 1, wherein the plurality of subject reference points are each situated at predefined features of the subject depicted performing the activity in the one or more electronically captured images.

3. The method of claim 2, the plurality of subject reference points comprising:

a first subject reference point and a second subject reference point situated at the eyes of the subject;

a third subject reference point situated at the nose of the subject;

a fourth subject reference point and a fifth subject reference point situated at the shoulders of the subject;

a sixth subject reference point and a seventh subject reference point situated at the elbows of the subject;

an eighth subject reference point and a ninth subject reference point situated at the hips of the subject;

a tenth subject reference point and an eleventh subject reference point situated at the knees of the subject; and a twelfth subject reference point and a thirteenth reference point situated at the feet of the subject.

4. The method of claim 3, wherein the activity comprises yoga.

5. The method of claim 2, the plurality of subject reference points comprising:

a first set of subject reference points situated at fingertips of the subject;

a second set of subject reference points situated at knuckles of the subject;

a third set of subject reference points situated at joints located between the fingers of the subject; and a fourth set of subject reference points situated at wrist bones of the subject.

6. The method of claim 5, wherein the plurality of subject reference points are defined by an object held by the subject while performing the activity.

7. The method of claim 6, the activity comprising golf, with at least some subject reference points defined by a golf club head, a golf club shaft, and a golf club grip.

8. The method of claim 5, wherein the activity comprises playing a piano.

9. The method of claim 1, the electronically altering the one or more electronically captured images comprising causing superimposition of the one or more arrows of the different sizes to appear in the one or more electronically altered images.

10. The method of claim 1, the electronically altering the one or more electronically captured images comprising causing one or more instructions instructing the subject to move a predefined feature of the subject toward a predefined standard reference point to appear in the one or more electronically captured images, with at least one instruction of the one or more instructions including the words "move this here."

11. The method of claim 1, the activity comprising dog training, the plurality of subject reference points including a canine nose reference point, canine eyes reference points, and a canine tail reference point.

12. The method of claim 1, the electronically altering the one or more electronically captured images comprising causing one or more geometric alignments presented in as angles referenced by measurements in degrees and identifying the differences between the at least one standard reference point and the at least one corresponding subject reference point in the one or more electronically altered images.

13. The method of claim 1, wherein the one or more electronically altered images comprise a ghost halo of the standard depicted performing the activity.

14. The method of claim 1, wherein the activity comprises achieving a predefined body alignment to score points in a video game.

15. The method of claim 1, the one or more electronically captured images depicting the subject performing the activity while holding the electronic device as it captures the one or more electronically captured images.

16. The method of claim 1 wherein the activity is either a sport or bodily movement required by a video game to score points.

17. A method in an electronic device, the method comprising:

receiving, with one or more processors, one or more electronically captured images depicting a subject performing an activity and comprising one or more subject reference points situated at predefined features of the subject;

obtaining, with the one or more processors, one or more electronic images of a standard depicted performing the activity and comprising one or more standard reference points situated at predefined features of the standard;

performing, with the one or more processors, a Procrustes superimposition operation one the one or more electronic images to superimpose a depiction of the standard upon a depiction of the subject in the one or more electronically captured images to create one or more electronically altered images; and causing, by the one or more processors, the one or more electronically altered images to be visibly presented on a display device;

the one or more electronically altered images comprising one or more arrows of different sizes to appear in the one or more electronically altered images, wherein the different sizes indicate how far the one or more standard reference points are situated from the one or more subject reference points, with larger arrows indicating greater divergence between the one or more standard reference points and the one or more subject reference points.

18. The method of claim 17, further comprising causing, by the one or more processors, the one or more electronically altered images to identify differences between the one or more standard reference points and the one or more subject reference points.

19. The method of claim 18, further comprising storing the differences between the one or more standard reference points subject reference points in metadata of the one or more electronically altered images.

20. The method of claim 19, the performing the Procrustes superimposition operation comprising one or more of translating, rotating, scaling, rotating, or reflecting, the depiction of the standard to cause the depiction of the standard and the depiction of the subject in the one or more electronically altered images to have substantially the same shape.

* * * * *